US012606384B2

(12) United States Patent
Nishikawa

(10) Patent No.: US 12,606,384 B2
(45) Date of Patent: Apr. 21, 2026

(54) ARTICLE TRANSPORT VEHICLE CONTROL SYSTEM

(71) Applicant: Daifuku Co., Ltd., Osaka (JP)

(72) Inventor: Tomoaki Nishikawa, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 105 days.

(21) Appl. No.: 18/582,872

(22) Filed: Feb. 21, 2024

(65) Prior Publication Data

US 2024/0278999 A1 Aug. 22, 2024

(30) Foreign Application Priority Data

Feb. 22, 2023 (JP) ................................. 2023-026238

(51) Int. Cl.
B65G 43/08 (2006.01)
(52) U.S. Cl.
CPC ...... B65G 43/08 (2013.01); B65G 2811/0673 (2013.01)
(58) Field of Classification Search
None
See application file for complete search history.

(56) References Cited

U.S. PATENT DOCUMENTS

| | | | | |
|---|---|---|---|---|
| 2019/0364492 A1* | 11/2019 | Azizi | ................ | H04W 52/0264 |
| 2021/0150036 A1* | 5/2021 | Kaneko | ................. | H04L 63/083 |
| 2022/0340370 A1* | 10/2022 | Kono | ..................... | B65G 43/08 |

FOREIGN PATENT DOCUMENTS

| | | | | |
|---|---|---|---|---|
| CN | 110136356 B | * | 2/2022 | ............. G07F 17/12 |
| JP | 2022112098 A | * | 8/2022 | ............. B65G 43/00 |
| JP | 2024001522 A | * | 1/2024 | |

* cited by examiner

*Primary Examiner* — Peter D Nolan
*Assistant Examiner* — Matthew Cobb
(74) *Attorney, Agent, or Firm* — The Webb Law Firm

(57) ABSTRACT

A control includes a control device configured to execute a plurality of types of processing including assignment processing of assigning one or more movement tasks for transporting the article, to one of the plurality of transport vehicles. In response to a processing load on the control device exceeding a predetermined reference load, the control system reduces the processing load on the control device by enabling a restriction mode in which the control device is restricted from executing target processing including one or more of the types of processing executed by the control device other than the assignment processing.

9 Claims, 4 Drawing Sheets

ARTICLE TRANSPORT VEHICLE CONTROL SYSTEM

CROSS-REFERENCE TO RELATED APPLICATION

This application claims priority to Japanese Patent Application No. 2023-026238 filed Feb. 22, 2023, the disclosure of which is hereby incorporated by reference in its entirety.

BACKGROUND OF THE INVENTION

1. Field of the Invention

The present invention relates to a control system for controlling a plurality of transport vehicles configured to transport an article.

2. Description of Related Art

An example of such a control system is disclosed in JP 2022-112098A (Patent Document 1). Hereinafter, in this description of the related art, the reference numerals in Patent Document 1 are cited in parentheses. A control system (30) according to Patent Document 1 includes a central control device (31) and a zone control device (32). The central control device (31) sends a request to transport an article (2), to the zone control device (32). The zone control device (32) assigns the request to transport the article (2), received from the central control device (31), to a transport vehicle (1), and instructs the transport vehicle (1) to execute operations in accordance with the request to transport the article (2).

The processing load on the control device included in the control system may increase due to an increase in the number of movement tasks executed to transport an article (such as the transport requests in Patent Document 1). If the processing load on the control device increases in this way, a situation in which the instructions to transport an article from the control device to the transport vehicles are delayed may persist for a long time, causing a long delay in the transport of the article in the system as a whole.

SUMMARY OF THE INVENTION

Therefore, it is desirable to realize a technique that prevents a large delay in the transport of an article in the system as a whole, even when the processing load on the control device increases.

A control system according to the present disclosure is control system for controlling a plurality of transport vehicles configured to transport an article, the control system including: a control device configured to execute a plurality of types of processing including assignment processing of assigning one or more movement tasks for transporting the article, to one of the plurality of transport vehicles, wherein in response to a processing load on the control device exceeding a predetermined reference load, the control system reduces the processing load on the control device by enabling a restriction mode in which the control device is restricted from executing target processing including one or more of the types of processing executed by the control device other than the assignment processing.

With this configuration, when the processing load on the control device exceeds the reference load and the restriction mode is enabled, the control device is restricted from executing the target processing so that the load on the control device can be reduced. Meanwhile, assignment processing is not included in the target processing, and therefore, the article can be transported continuously even in the restriction mode. The control device, whose processing load is reduced by being restricted from executing the target processing, can instruct the transport vehicles to transport the article. Therefore, even if the processing load on the control device becomes high enough to exceed the reference load, it is possible to avoid a situation in which the instructions to transport the article from the control device to the transport vehicles are delayed persists for a long time, and to make it less likely that a long delay will occur in the transport of the article in the system as a whole.

Other features and advantages of the control system will become apparent from the following description of an embodiment described with reference to the drawings.

DESCRIPTION OF THE INVENTION

Figure 3:
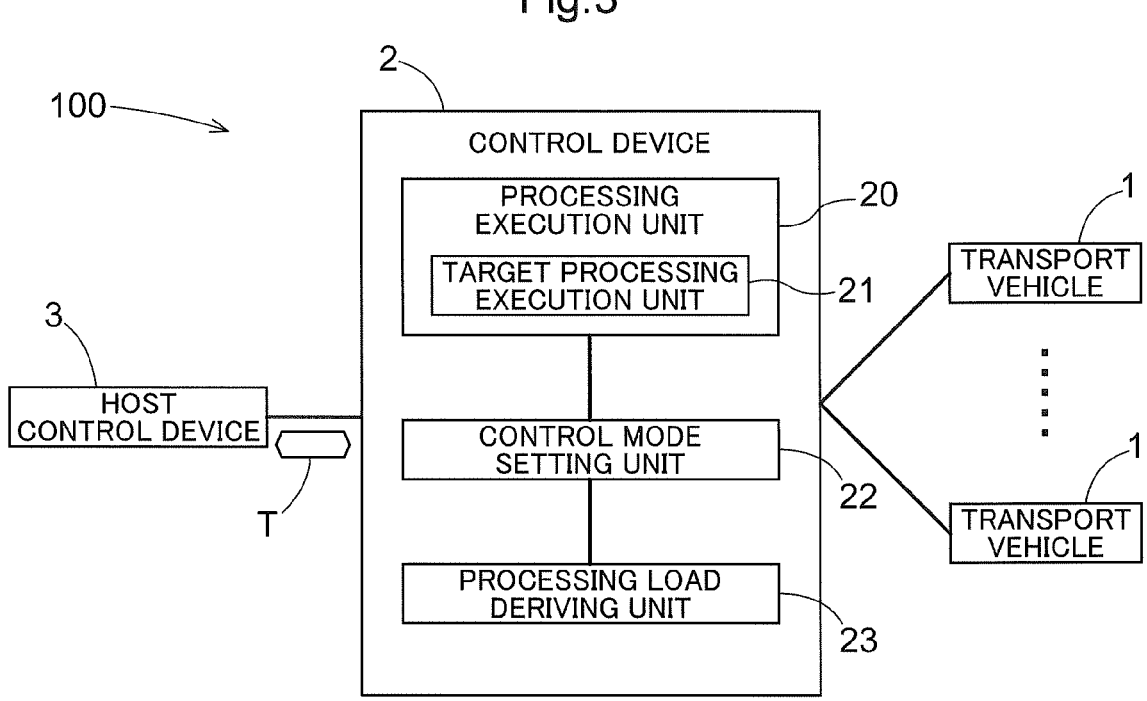
FIG. 3 is a control block diagram according to an embodiment.

An embodiment of a control system will be described based on the drawings. As shown in FIG. 3, a control system 100 is a system that controls a plurality of transport vehicles 1 that transport an article W (see FIG. 4). Although detailed illustration of the article W is omitted, the article W is, for example, a FOUP (Front Opening Unified Pod) that accommodates a semiconductor wafer.

Figure 1:
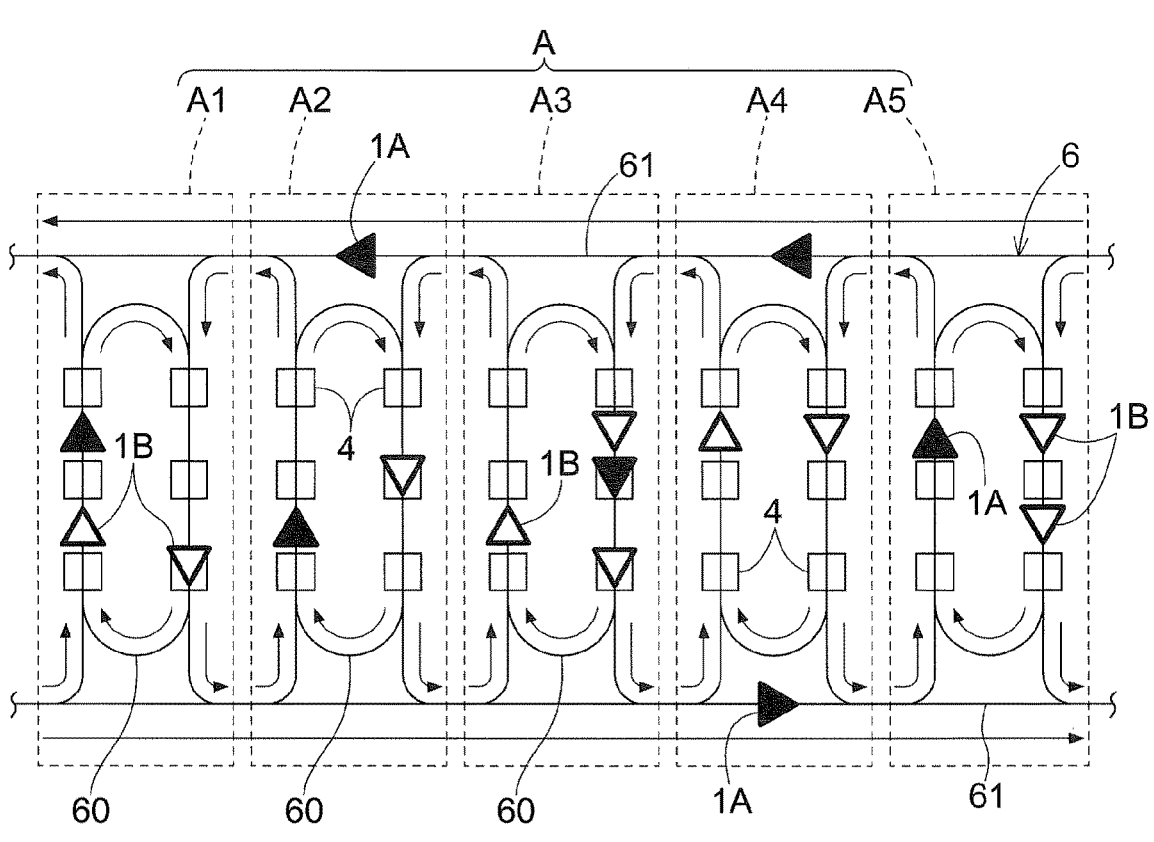
FIG. 1 is a diagram showing an example of a layout of a transport facility to which a control system is applied.
Figure 2:
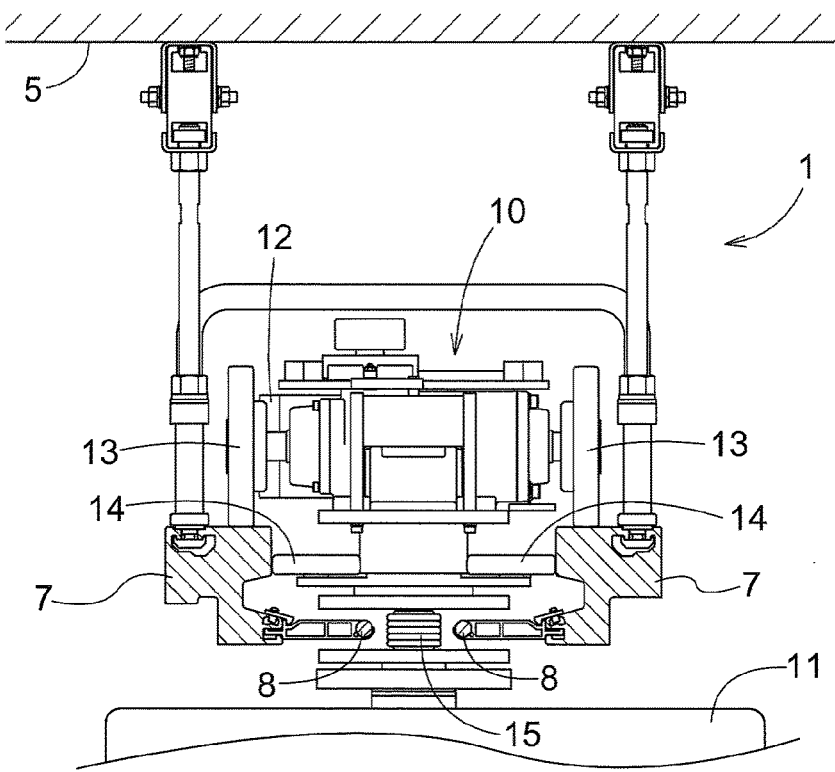
FIG. 2 is a diagram showing an example of a transport vehicle.

The transport vehicles 1 travel along a travel path 6 (see FIG. 1) to transport the article W. The transport vehicles 1 are unmanned transport vehicles. The travel path 6 may be formed physically or virtually. In the present embodiment, the travel path 6 is physically formed with rails 7 (see FIG. 2) described below. In FIG. 2, it is assumed that the travel path 6 shown in FIG. 1 is formed on a ceiling 5. However, the travel path 6 may be formed on the floor or the like. As indicated by an arrow in FIG. 1, the direction of travel of the transport vehicles 1 is set to one direction on each section of the travel path 6. Note that in FIG. 1 and in FIGS. 4 to 7 to be referred to later, the transport vehicles 1 are distinguished between active transport vehicles 1A, each indicated by a black solid triangle, and empty transport vehicles 1B, each indicated by an open triangle. The active transport vehicles 1A and the empty transport vehicles 1B will be described later. In the example shown in FIG. 1, the travel path 6 includes annular paths 60, each formed in an annular shape in a plan view, and connecting paths 61, each connecting a plurality of annular paths 60. Each transport vehicle 1 can travel from an annular path 60 to another annular path 60 via a connecting path 61.

As shown in FIG. 1, a plurality of stations 4 are set along the travel path 6. Although not shown, an article support unit that supports the article W is provided at each station 4, and the article W is transferred between a transport vehicle 1 and an article support unit at each station 4. Each article support unit is, for example, a load port of a processing device that processes the article W (or an item accommodated in the article W), a loading and unloading port of a storage device that stores the article W, or a storage shelf that temporarily stores the article W. The article support units are disposed immediately below the travel path 6, for example.

The operations of each transport vehicle 1 includes a travel operation that is executed to travel along the travel path 6. In the present embodiment, the transfer of the article W between a transport vehicle 1 and an article support unit provided at each station 4 is carried out by the transport vehicles 1 moving the article W. Therefore, the operations of each transport vehicle 1 include transfer operations executed to transfer the article W at a station 4. Specifically, the operations of each transport vehicle 1 include an operation executed to receive the article W from an article support unit at a station 4 and an operation executed to unload the article W to an article support unit at a station 4.

FIG. 2 shows an example of a transport vehicle 1. The transport vehicle 1 shown in FIG. 2 includes a travel section 10 that travels along the travel path 6 (see FIG. 1). This transport vehicle 1 further includes a body 11 coupled to the travel section 10, and the article W is transported by the transport vehicle 1 in the state of being accommodated in the body 11. The travel path 6 is formed with the use of rails 7 (here, a pair of rails 7 spaced apart in a path width direction). The path width direction is a direction orthogonal to both the longitudinal direction and the up-down direction (the vertical direction) of the travel path 6 (the left-right direction in FIG. 2). In the example shown in FIG. 2, the rails 7 are suspended from and supported by the ceiling 5, and the travel path 6 is formed along the ceiling 5.

The travel section 10 shown in FIG. 2 includes travel wheels 13 that roll on the travel surfaces (here, the upper surfaces) of the rails 7, and a drive motor 12 that rotates the travel wheels 13. The travel wheels 13 are rotated by the drive motor 12 so that the travel section 10 travels along the travel path 6. The travel section 10 shown in FIG. 2 further includes guide wheels 14 that roll on guide surfaces (here, the side surfaces facing in the path width direction) of the rails 7, and the travel section 10 travels along the rails 7 with the guide wheels 14 guided to be in contact with the guide surfaces of the rails 7.

In the present embodiment, the transport vehicle 1 includes a power receiving device 15 that receives power in a contactless manner from power feeder lines 8 disposed along the travel path 6. In the example shown in FIG. 2, the power feeder lines 8 are disposed along the rails 7 that form the travel path 6. The transport vehicle 1 operates with the power received by the power receiving device 15. In other words, the power received by the power receiving device 15 is supplied to an actuator (for example, the above-described drive motor 12) that is used to enable the transport vehicle 1 to operate. The power receiving device 15 includes, for example, a pickup coil. AC power is induced in the pickup coil by a magnetic field generated around the power feeder lines 8 to which AC current is supplied. This AC power is converted into DC power, for example, and is supplied to the actuator that is used to enable the transport vehicle 1 to operate.

As shown in FIG. 3, the control system 100 includes a control device 2. The control device 2 includes an arithmetic processing device such as a CPU (Central Processing Unit) and peripheral circuits such as a memory, and the functions of the control device 2 are realized by these pieces of hardware cooperating with programs executed on hardware such as the arithmetic processing device. A "device" such as the control device 2 or a host control device 3, which will be described later, may be a collection of a plurality of devices that can communicate with each other, rather than a single device. For example, the control device 2 may include a plurality of division control devices that each manage different divisional areas A (described later).

Various technical features of the control device 2 described below are also applicable to an operation method for the control device 2 and a program used to enable a computer to function as the control device 2, and such an operation method and such a program, as well as a recording medium (a computer-readable recording medium such as an optical disk or a flash memory) on which such a program is recorded, are also disclosed in the present specification. The program used to enable a computer to function as the control device 2 is provided from a recording medium on which the program is recorded, or is provided via a communication network, for example, and the program thus provided is stored in a storage device that can be referenced by the control device 2.

The control device 2 grasps the current position of each of the plurality of transport vehicles 1. In the present embodiment, each transport vehicle 1 is configured to detect the current position thereof, and the control device 2 acquires, from each transport vehicle 1, information regarding the current position of the transport vehicle 1, thereby grasping the current position of each of the plurality of transport vehicles 1. Although the details are omitted, for example, detection targets holding position information (for example, one-dimensional codes, two-dimensional codes, RF (Radio Frequency) tags, or the like) may be provided at a plurality of positions along the travel path 6, and each transport vehicle 1 may be configured to detect the current position thereof by reading the position information held by the detection targets. Alternatively, each transport vehicle 1 may be configured to detect the current position thereof based on an output from a positioning device such as a GNSS (Global Navigation Satellite System) receiver.

As shown in FIG. 3, the control device 2 includes a processing execution unit 20, a control mode setting unit 22, and a processing load derivation unit 23. The processing execution unit 20 includes a target processing execution unit 21. The control device 2 includes a plurality of functional units in this way. The details of each functional unit will be described later. The plurality of functional units included in the control device 2 are at least logically distinct, and do not necessarily have to be physically distinct.

The control device 2 (specifically, the processing execution unit 20) executes a plurality of types of processing, including assignment processing. Assignment processing is processing executed to assign a movement task T for transporting the article W, to one of the plurality of transport vehicles 1. Here, transport vehicles 1 to which the movement task T is assigned are referred to as an "active transport vehicles 1A", and transport vehicles 1 to which the movement task T is not assigned are referred to as an "empty transport vehicles 1B" (see FIG. 1. and so on). The control device 2 instructs the transport vehicles 1 to which the movement task T is assigned to execute the movement task T. Each transport vehicle 1 that has received the instruction operates to execute the movement task T. Specifically, a control unit (not shown) provided in the transport vehicle 1 controls the transport vehicle 1 to execute operations for the movement task T.

The movement task T may be generated by the control device 2 or by another device that can communicate with the control device 2. As shown in FIG. 3, in the present embodiment, the host control device 3, which manages transport in the entire equipment to which the control system 100 is applied, is configured to generate the movement task T and transmit it to the control device 2. The host control device 3 generates the movement task T, for example, based on the transport schedule for the article W or in response to the occurrence of a request to transport the article W.

The movement task T includes at least a first task from first and second tasks. In the present embodiment, the movement task T includes both the first task and the second task.

The first task is the task of transporting the article W from a transport source to a transport destination. In the present embodiment, the transport source of the article W and the transport destination of the article W are stations 4 (specifically, the above-described article support units provided at the stations 4). Hereinafter, each station 4 from which the article W is transported is referred to as a "transport source station 40", and each station 4 to which the article W is transported is referred to as a "transport destination station 41" (see FIGS. 4 to 6). The first task includes information regarding the transport source station 40 and information regarding the transport destination station 41.

A transport vehicle 1 to which the first task is assigned through assignment processing transports the article W from the transport source station 40 specified in the first task to the transport destination station 41 specified in the first task. At this time, the transport vehicle 1 travels to the transport source station 40, receives the article W at the transport source station 40, and thereafter travels to the transport destination station 41. The article W is unloaded from the transport vehicle 1 at the transport destination station 41. In assignment processing, the first task is preferentially assigned to an empty transport vehicle 1B that is located near the transport source station 40. For example, when an empty transport vehicle 1B is waiting at the transport source station 40, the first task is assigned to this empty transport vehicle 1B. The first task can also be assigned to an active transport vehicle 1A, and in this case, the active transport vehicle 1A basically executes the movement tasks T sequentially, starting with the first assigned movement task T.

The second task is the task of placing a transport vehicle 1 that is not transporting the article W, at a location that is planned or predicted to be the transport source of the article W. The second task includes information regarding a location (a station 4 in the present embodiment) that is planned or predicted to be the transport source of the article W. In assignment processing, for example, the second task is preferentially assigned to an empty transport vehicle 1B that is located near a station 4 that is planned or predicted to be the transport source of the article W.

The transport vehicle 1 to which the second task is assigned through assignment processing travels to the station 4 that is planned or predicted to be the transport source of the article W, specified in the second task. Thereafter, the transport vehicle 1 waits at the station 4 until another movement task T (for example, the first task specifying this station 4 as the transport source) is assigned thereto. Note that by the time the transport vehicle 1 arrives at the station 4 specified in the second task, another movement task T (for example, the first task specifying this station 4 as the transport source) may be assigned to the transport vehicle 1.

In the present embodiment, the second task includes both the task of placing a transport vehicle 1 that is not transporting the article W at a location that is planned to be the transport source of the article W (hereinafter referred to as a "first vehicle dispatch task") and the task of placing a transport vehicle 1 that is not transporting the article W at a location that is predicted to be the transport source of the article W (hereinafter referred to as a "second vehicle dispatch task"). In the present embodiment, the movement task T is basically generated by the host control device 3, but the second vehicle dispatch task is generated by the control device 2.

If the article support unit provided at a station 4 is a load port of a processing device, and the processing device is processing the article W (or an item accommodated in the article W), a request to unload the processed article W from the load port occurs when the processing is complete. Therefore, this station 4 is at a location that is planned to be the transport source of the article W, and it is also possible to determine whether or not this station 4 is planned to be the transport source of the article W within a set time based on the state of the processing device (for example, the progress status of the processing). If the article support unit provided at a station 4 is a loading and unloading port of a storage device, and if there is a request to unload the article W from the storage device, a request to unload the article W from the loading and unloading port occurs when the article W to be unloaded is transported from the stage unit of the storage device to the loading and unloading port. Therefore, this station 4 is at a location that is planned to be the transport source of the article W, and it is also possible to determine whether or not this station 4 is planned to be the transport source of the article W within a set time based on the state of the storage device. In this way, the host control device 3 grasps the station 4 that is planned to be the transport source of the article W, and generates the first vehicle dispatch task to place the transport vehicle 1 that is not transporting the article W at the station 4 that is planned to be the transport source of the article W within a set time, for example.

In addition, there are cases in which the plurality of stations 4 include a station 4 (hereinafter referred to as a "high-frequency station") that becomes the transport source of the article W more frequently than other stations 4. The control device 2 determines that such a high-frequency station is a station 4 that is predicted to be the transport source of the article W, and generates the second vehicle dispatch task to place the transport vehicles 1 that is not transporting the article W at the station 4. For example, when an empty transport vehicle 1B is not waiting at a high-frequency station, the control device 2 generates the second vehicle dispatch task to place a transport vehicle 1 that is not transporting the article W at the high-frequency station. The high-frequency station may be set in advance by an operator, for example.

In the present embodiment, the plurality of types of processing executed by the control device 2 (specifically, the processing execution unit 20) includes at least one (in this example, both) of abnormality addressing processing and entry restriction processing. Abnormality addressing processing is processing executed to address an abnormality that occurs in the transport vehicles 1. The control device 2 executes abnormality addressing processing when an abnormality occurs in the transport vehicles 1. Abnormality addressing processing is, for example, processing executed to stop the transport vehicle 1 in which an abnormality occurs, or processing executed to move the transport vehicle 1 in which an abnormality occurs to a location (for example, an evacuation lane or a maintenance area) where the transport vehicle 1 is less likely to prevent other transport vehicles 1 from traveling.

Entry restriction processing is processing executed to restrict the transport vehicles 1 from entering specific areas (hereinafter referred to as "entry restriction areas"). The control device 2 sets, for example, areas where there is a path on which, for example, the presence of a transport vehicle 1 that has stopped abnormally prevents other transport vehicles 1 from traveling, and areas where the upper limit of the number of transport vehicles 1 set to ensure smooth travel of transport vehicles 1 has been reached, as entry restriction areas. If an entry restriction area is set, the control device 2 executes entry restriction processing on the entry restriction area. The transport vehicles 1 travel along a travel route that is set so that the movement task T can be executed, but the control device 2 prohibits the setting of a travel route that enters the entry restriction area to restrict the transport vehicles 1 from entering the area. In the present embodiment, the travel route of the transport vehicles 1, which is set so that the movement task T can be executed, is set by the control device 2 and transmitted to the transport vehicles 1. Each transport vehicle 1 has map information that is information regarding the layout of the travel path 6, and travels along the set travel route based on the current position thereof and the map information.

As described above, in the present embodiment, each transport vehicle 1 includes the power receiving device 15, which receives power from the power feeder lines 8 disposed along the travel path 6 in a non-contact manner. In the present embodiment, the area in which the transport vehicles 1 travel is divided into a plurality of power feeding areas, and power is supplied to the transport vehicles 1 in each of the power feeding areas. Note that the power feeding areas may be divided areas as with the divisional areas A (see FIG. 1) described below. When a large number of transport vehicles 1 enter a single power feeding area, the power supply to each transport vehicle 1 may be insufficient due to the limitation of the power supply capacity. Therefore, an upper limit on the number of transport vehicles 1 may be set for each power supply area determined based on the limitation of the power supply capacity. In this case, the control device 2 sets the power feeding areas where the number of transport vehicles 1 has reached the upper limit number as entry restriction areas.

Here, at least one type of processing of the plurality of types of processing executed by the control device 2 other than assignment processing is referred to as "target processing". Target processing is executed by the target processing execution unit 21 included in the processing execution unit 20. In the present embodiment, as with assignment processing, the above-described abnormality addressing processing and entry restriction processing are also excluded from the target processing.

This control system 100 is configured to reduce the load on the control device 2 by enabling a restriction mode in which the control device 2 is restricted from executing the target processing when the processing load on the control device 2 exceeds a predetermined reference load (hereinafter referred to as a "first reference load"). In the present embodiment, the processing load derivation unit 23 included in the control device 2 derives the processing load on the control device 2, and the control mode setting unit 22 included in the control device 2 sets the control mode (operation mode) of the control device 2 (see FIG. 3).

Hereinafter, a control mode that is not the restriction mode is referred to as a "normal mode".

In a state where the control mode of the control device 2 is set to the normal mode, the control mode setting unit 22 changes the control mode of the control device 2 from the normal mode to the restriction mode when the processing load on the control device 2 exceeds the first reference load. In a state where the control mode of the control device 2 is set to the restriction mode, the control mode setting unit 22 changes the control mode of the control device 2 from the restriction mode to the normal mode when the processing load on the control device 2 becomes equal to or less than a second reference load. The second reference load is set to a value equal to or less than the first reference load. In the present embodiment, the second reference load is set to a value less than the first reference load.

In the present embodiment, the processing load derivation unit 23 derives the processing load on the control device 2 based on the value obtained by dividing the total number of unfinished movement tasks T held by the control device 2 by the total number of transport vehicles 1 controlled by the control device 2. For example, the processing load derivation unit 23 derives the above value as the processing load on the control device 2 without any change. The transport vehicles 1 controlled by the control device 2 are, for example, transport vehicles 1 that are under the control of the control device 2, that are present on the travel path 6, that are in an active state, and that are in a state of being able to communicate with the control device 2. A transport vehicle 1 that is removed from the travel path 6 due to an abnormality, failure, or the like is not included in the transport vehicles 1 controlled by the control device 2.

In the present embodiment, the control device 2 has movement tasks T generated by the host control device 3 and transmitted to the control device 2 (specifically, the first task and the first vehicle dispatch task) and the movement task T generated by the control device 2 (specifically, the second vehicle dispatch task). The first task is determined to be completed after the first task has been assigned to a transport vehicle 1 (for example, when the article W is unloaded from the transport vehicle 1 at the transport destination station 41 specified in the first task). Each second task (the first vehicle dispatch task or the second vehicle dispatch task) is determined to be completed after the second task has been assigned to a transport vehicle 1 (for example, when the transport vehicle 1 arrives at the station 4 specified in the second task).

Examples of the types of processing executed by the control device 2 (specifically, the processing execution unit 20) include reconsideration processing, search processing, sequential assignment processing, repetition processing, reassignment processing, empty transport vehicle moving processing, vehicle dispatch task acceptance processing, vehicle assignment task generation processing, map distribution processing, route resetting processing, normal expulsion processing, assignment limiting processing, and evacuation destination limitation processing, which will be described below. The following describes the contents of each of these types of processing and the contents of the restrictions in the restriction mode when the processing is included in the target processing.

Reconsideration Processing

Figure 4:
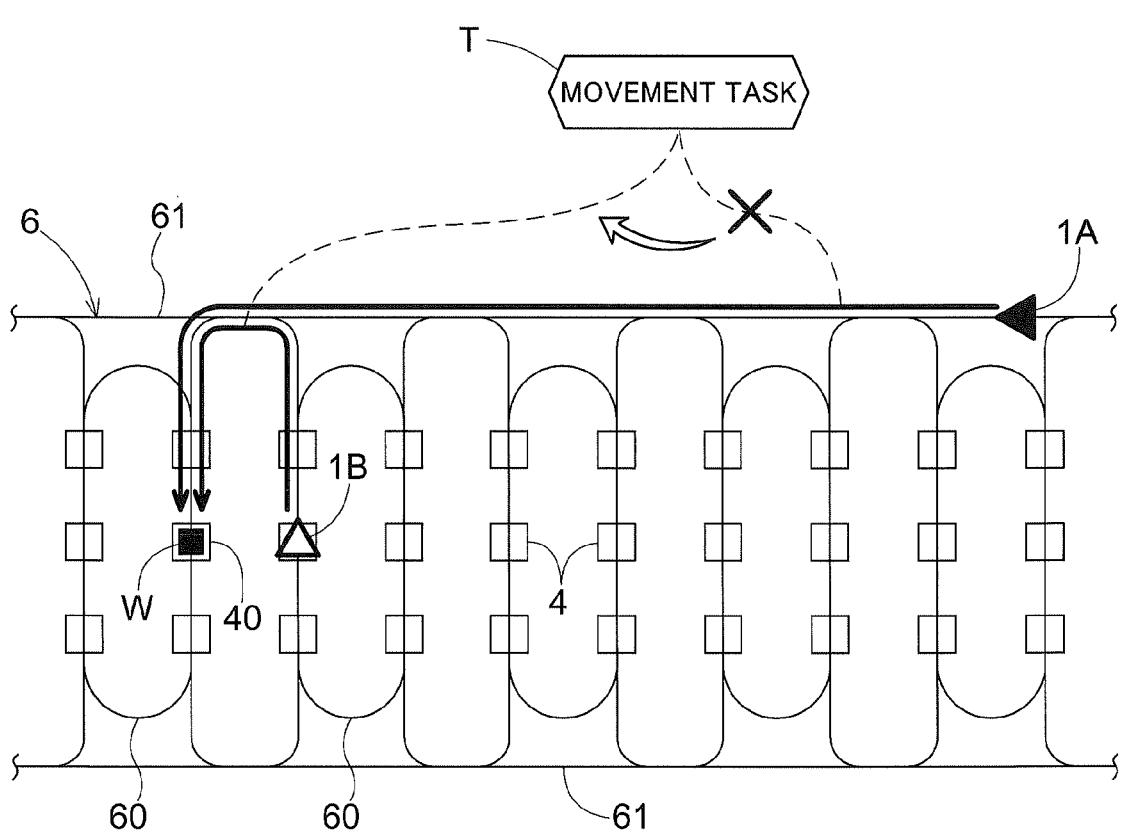
FIG. 4 is a diagram illustrating reconsideration processing.
Figure 5:
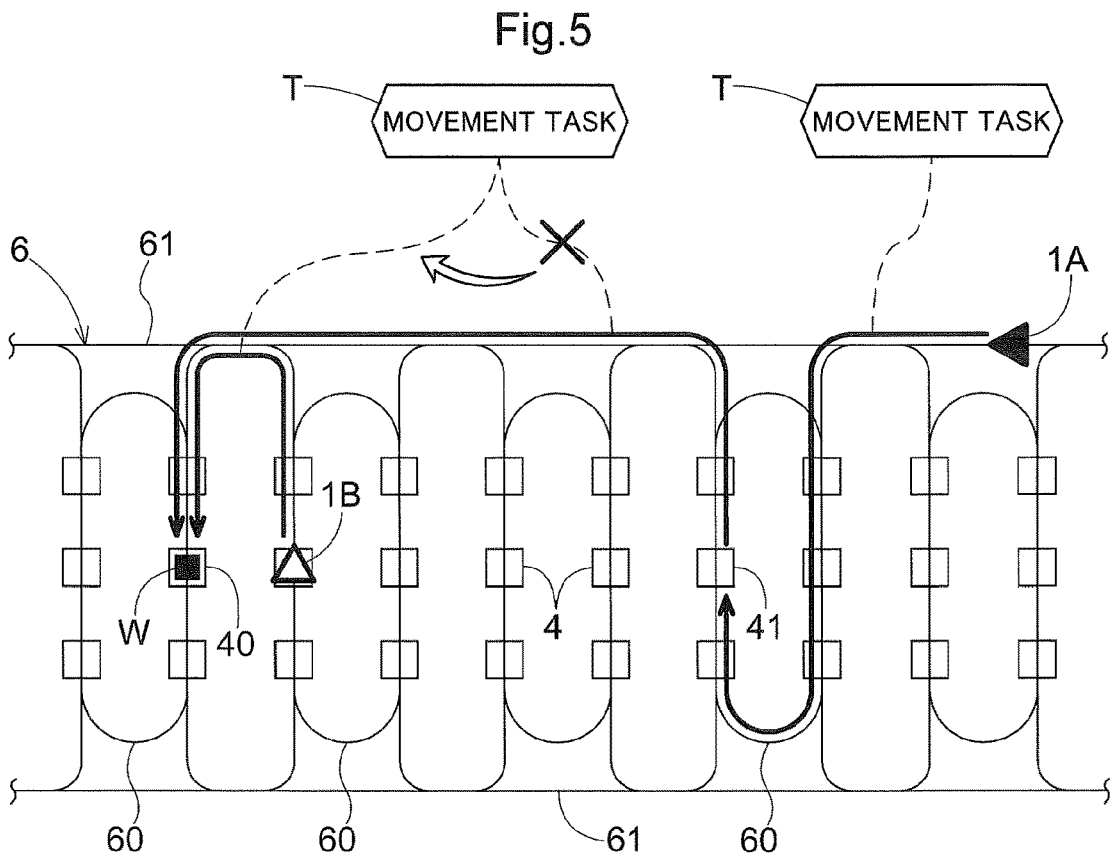
FIG. 5 is another diagram illustrating reconsideration processing.

Reconsideration processing is processing that is executed to reassign a second transport vehicle to a movement task T to which a first transport vehicle has already been assigned in assignment processing, where the first transport vehicle is one of the transport vehicles 1 and the second transport vehicle is a transport vehicle 1 different from the first transport vehicle. FIGS. 4 and 5 show two examples of reconsideration processing executed for the first task. In these examples, the active transport vehicle 1A is equivalent to the "first transport vehicle", and the empty transport vehicle 1B is equivalent to the "second transport vehicle". The example in FIG. 4 shows a situation in which, while an active transport vehicle 1A to which the movement task T (the first task in this example) is assigned is traveling toward the transport source station 40, another transport vehicle 1 becomes an empty transport vehicle 1B from an active transport vehicle 1A near the transport source station 40, and the movement task T is reassigned to the empty transport vehicle 1B, which can reach the transport source station 40 earlier. The example in FIG. 5 shows a situation in which, while an active transport vehicle 1A to which two movement tasks T (the first tasks in this example) are assigned is traveling toward the transport destination station 41 specified in the first movement task T, another transport vehicles 1 becomes an empty transport vehicle 1B from an active transport vehicle 1A near the transport source station 40 specified in the second movement task T, and the second movement task T is reassigned to the empty transport vehicle 1B, which can reach the transport source station 40 earlier.

If reconsideration processing is included in the target processing, the control device 2 is prohibited from executing the reconsideration processing in the restriction mode. Note that in a situation where a large number of movement tasks T have occurred and the restriction mode has been enabled, there may be an insufficient number of empty transport vehicles 1B, and therefore, even if reconsideration processing is executed, it may happen that a more suitable transport vehicle 1 cannot be found and the load on the control device 2 becomes unnecessarily high. In the restriction mode, by prohibiting the execution of reconsideration processing, it is possible to avoid the above-described unnecessary increase in the load on the control device 2.

Search Processing

Figure 6:
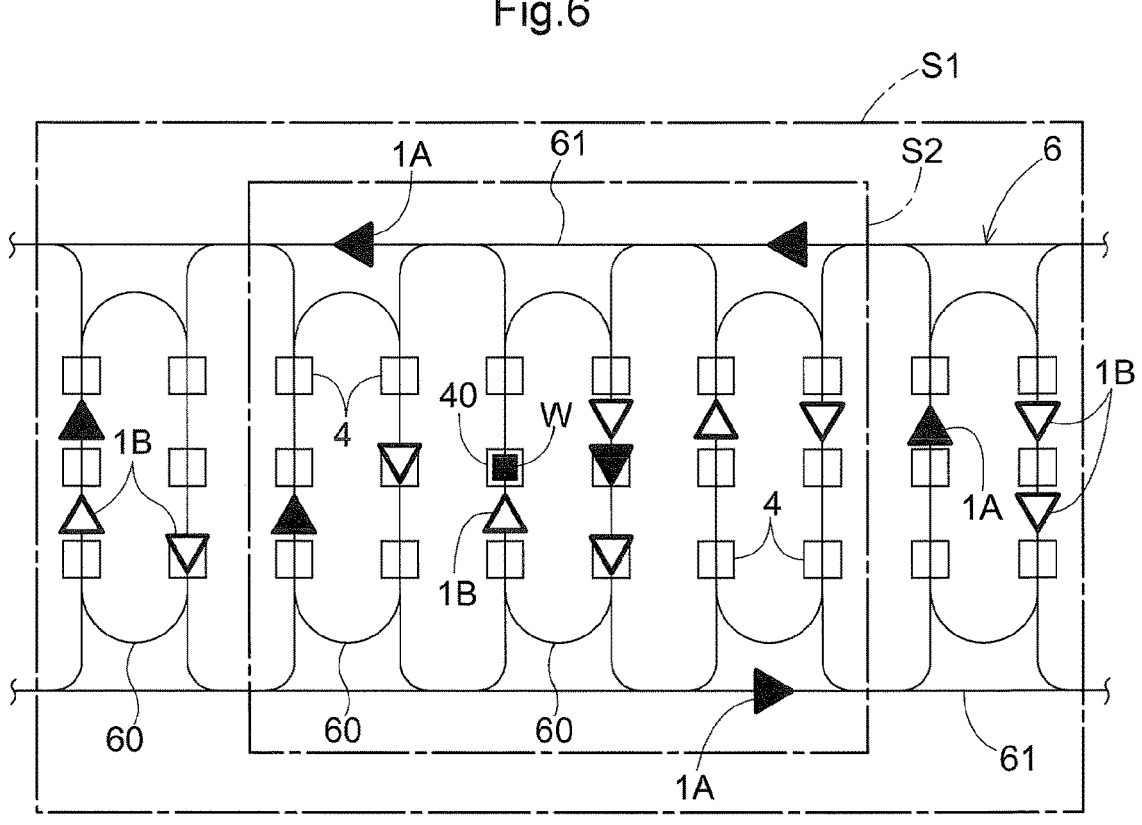
FIG. 6 is a diagram illustrating the range of a transport vehicle search.

Search processing is processing that is executed to search for a transport vehicle 1 to which a movement task T is to be assigned in assignment processing. The reference point for the first task is the source station 40 specified in the first task, the reference point for the second task is the station 4 specified in the second task (the station 4 that is planned or predicted to be the transport source of the article W), and the range within which the transport vehicle 1 is searched for (hereinafter referred to as "the search range") in search processing is set to include the reference points. FIG. 6 shows an example of a search range set for the first task (i.e., a search range whose reference point is the transport source station 40). In the example shown in FIG. 6, it is assumed that the size of the search range is defined as the number of annular paths 60 contained in the search range, and a first search range S1, which contains five annular paths 60, is wider than a second search range S2, which contains three annular paths 60. Note that the size of the search range may be defined as the distance to the above-described reference point (distance along the travel path 6 or a straight-line distance).

When search processing is included in the target processing, the range in which the transport vehicle 1 is searched for in search processing is set narrower in the restriction mode than when the restriction mode is not enabled (in this example, when the normal mode is enabled). For example, as with the second search range S2 shown in FIG. 6, the search range in the restriction mode is set to include the annular path 60 on which the above-described reference point is located and the annular paths 60 on both sides thereof. For example, the search range in the normal mode is set to be the entire area in which the transport vehicles 1 travel (the entire area in the layout of the travel path 6).

Sequential Assignment Processing

Sequential assignment processing is processing in which assignment processing is sequentially executed on one or more movement tasks T to which no transport vehicle 1 is assigned. Sequential assignment processing is executed until a termination condition is satisfied, and sequential assignment processing is terminated when the termination condition is satisfied. The control device 2 repeatedly executes sequential assignment processing.

If sequential assignment processing that is executed repeatedly is included in the target processing, the termination condition for the sequential assignment processing is set so that the number of times the assignment processing can be executed is smaller in the restriction mode than when the restriction mode is not enabled (in this example, when the normal mode is enabled). Here, a movement task T to which no transport vehicle 1 is assigned is referred to as an "unassigned task", the condition that transport vehicles 1 are assigned to all unassigned tasks held by the control device 2 is referred to as a "first condition", and the condition that the number of times assignment processing has been executed reaches the number of times the assignment processing can be executed described above is referred to as a "second condition". The control device 2 terminates sequential assignment processing when the first condition or the second condition is satisfied. Note that the number of times assignment processing has been executed and the number of times assignment processing can be executed may be the number of times assignment processing has been executed in which no transport vehicle 1 to be assigned has been found. In addition, the number of times assignment processing can be executed in the normal mode may be set to infinity (i.e., there is no upper limit).

Repetition Processing

Figure 8:
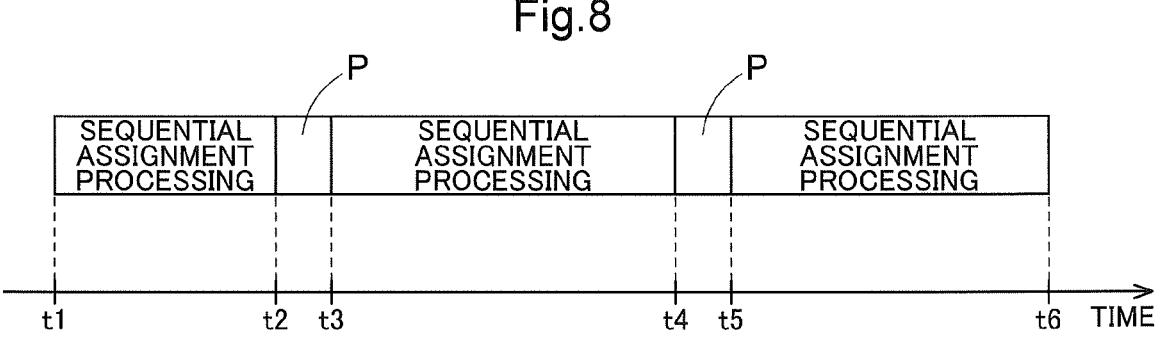
FIG. 8 is a diagram illustrating repetition processing.

Repetition processing is processing in which sequential assignment processing is executed repeatedly. In the present embodiment, as shown in FIG. 8, the control device 2 repeatedly executes sequential assignment processing at intervals P. As shown in FIG. 8, the periods in which sequential assignment processing is executed (in the example shown in FIG. 8, the period from a time t1 to a time t2, the period from a time t3 to a time t4, and the period from a time t5 to a time t6) may change each time, and the length of the intervals P may be fixed or variable. For example, in each of the intervals P, the following processing is executed: processing for setting or resetting the travel route to execute a movement task T; processing for providing a transport vehicle 1 to which a movement task T is assigned with an instruction (such as an instruction to execute the movement task T); processing for receiving a movement task T from the host control device 3; abnormality addressing processing; or entry restriction processing. When repetition processing is included in the target processing, the period from the end of sequential assignment processing to the start of the next sequential assignment processing in the repetition processing (i.e. the length of each interval period P) is set longer in the restriction mode than when the restriction mode is not enabled (in this example, when the normal mode is enabled).

Reassignment Processing

The reassignment processing is processing that is executed to execute assignment processing again with respect to a movement task T to which no transport vehicle 1 could be assigned in assignment processing. If reassignment processing is included in the target processing, the period from the execution of the previous assignment processing to the execution of the reassignment processing is set longer in the restriction mode than when the restriction mode is not enabled (in this example, when the normal mode is enabled). For example, in the normal mode, reassignment processing for a movement task T to which no transport vehicle 1 could be assigned in assignment processing is executed in the first sequential assignment processing after the sequential assignment processing in which the assignment processing was executed, and in the restriction mode, reassignment processing for a movement task T to which no transport vehicle 1 could be assigned in assignment processing is executed in the second or later sequential assignment processing after the sequential assignment processing in which the assignment processing was executed.

Empty Transport Vehicle Moving Processing

Figure 7:
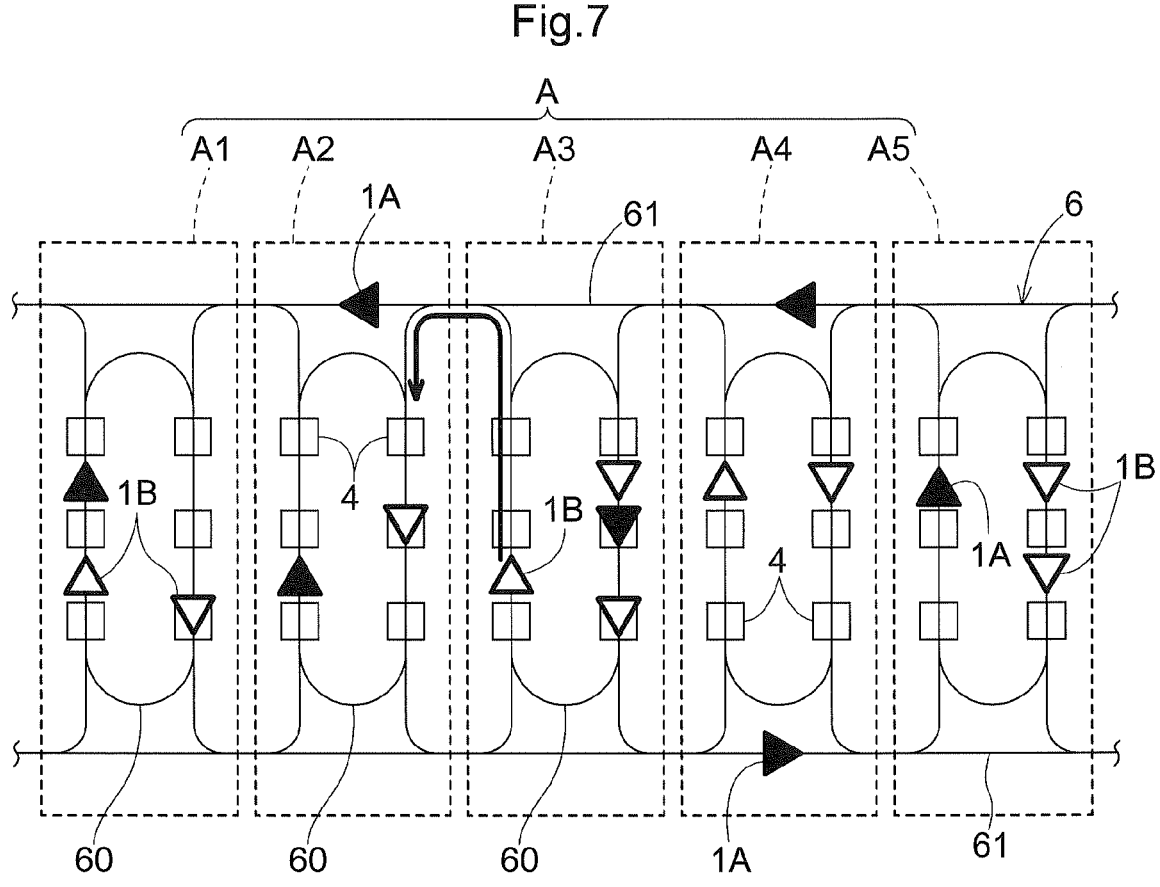
FIG. 7 is a diagram illustrating empty vehicle moving processing.

The control device 2 may be configured to divide the area in which transport vehicles 1 travel into a plurality of divisional areas A and manage them. FIG. 1 shows examples of the divisional areas A. Specifically, FIG. 1 shows five divisional areas A, namely, a first divisional area A1, a second divisional area A2, a third divisional area A3, a fourth divisional area A4, and a fifth divisional area A5. Empty transport vehicle moving processing is processing that is executed to move empty transport vehicles 1B so that the number of empty transport vehicles 1B in each of the plurality of divisional areas A becomes close to a target value set for the respect divisional area of the plurality of divisional areas A. FIG. 7 shows an example of empty transport vehicle moving processing. In FIG. 7, it is assumed that the target value set for each of the divisional areas A is two. In this case, one empty transport vehicle 1B is moved from the third divisional area A3 to the second divisional area A2 as indicated by an arrow in the figure, so that the number of empty transport vehicles 1B in each of the five divisional areas A becomes two.

If empty transport vehicle moving processing is included in the target processing, in the restriction mode, the control device 2 is prohibited to execute empty transport vehicle moving processing, or the maximum allowed travel distance of empty transport vehicles 1B in the empty transport vehicle moving processing is set shorter than when the restriction mode is not enabled (in this example, when the normal mode is enabled). The aforementioned maximum travel distance in the normal mode may be set to infinity (i.e., there is no upper limit). Note that in a situation where a large number of movement tasks T have occurred and the mode has been set to the restriction mode, there are a small number of empty transport vehicles 1B, so movement tasks T may be assigned to empty transport vehicles 1B that are traveling in the empty transport vehicle moving processing, which may increase the likelihood that such travels are wasteful. In the restriction mode, the execution of the empty transport vehicle moving processing is restricted as described above so that the transport vehicles 1 are less likely to make such wasteful travel.

Vehicle Dispatch Task Acceptance Processing

Vehicle dispatch task acceptance processing is processing that is executed to accept the first vehicle dispatch task received from the host control device 3 as a movement task T that is to be targeted in the assignment processing. By executing vehicle dispatch task acceptance processing, transport vehicles 1 can be caused to execute the first vehicle dispatch task as described above. If vehicle dispatch task acceptance processing is included in the target processing, the control device 2 is prohibited from executing the vehicle dispatch task acceptance processing in the restriction mode. Therefore, the first vehicle dispatch task is not executed in the restriction mode. If this is the case, the control device 2 discards the first vehicle dispatch task received from the host control device 3, for example. Note that in a situation where a large number of movement tasks T have occurred and the mode has been set to the restriction mode, it is easier to reduce the load on the control device 2 by assigning a transport vehicle 1 that is not transporting the article W to the first task than to the first vehicle dispatch task. In addition to being able to reduce the number of instances of processing executed by the control device 2, it is also preferable from this point of view to prohibit the vehicle dispatch task acceptance processing from being executed in the restriction mode. For a similar reason, it is preferable that the vehicle assignment task generation processing is prohibited from being executed in the restriction mode as described below.

Vehicle Assignment Task Generation Processing

Vehicle assignment task generation processing is processing that is executed to generate a second vehicle dispatch task. By executing vehicle dispatch task generation processing, transport vehicles 1 can be caused to execute the second vehicle dispatch task as described above. If vehicle assignment task generation processing is included in the target processing, the control device 2 is prohibited from executing the vehicle assignment task generation processing in the restriction mode. Therefore, the second vehicle dispatch task is not executed in the restriction mode.

Map Distribution Processing

Map distribution processing is processing that is executed to distribute updated map information to transport vehicles 1 when map information, which is information regarding the layout of the travel path 6, is updated. The map information distributed to a transport vehicle 1 is used when the transport vehicle 1 travels along the travel route. If map distribution processing is included in the target processing, the control device 2 is prohibited from executing the map distribution processing in the restriction mode. The map distribution processing in the case where map information has been updated is not directly related to the transport of the article W. In view of this point, it is preferable to prohibit execution of map distribution processing in the restriction mode and give priority to reducing the load on the control device 2. Note that even in the restriction mode, map distribution processing may be exceptionally executed for transport vehicles 1 that are present in a specific area. For example, when a plurality of control devices 2 are provided and each of the control devices 2 controls a different area, this specific area is considered to be an area near the boundary between an area that is under the control of one control device 2 and an area that is under the control of another control device 2.

Route Resetting Processing

As described above, in the present embodiment, the travel route for a transport vehicle 1 to execute the movement task T is set by the control device 2, i.e., the control device 2 (specifically, the processing execution unit 20) executes a route setting processing that is executed to set, with respect to a movement task T, a travel route for the transport vehicle 1 to execute the movement task T. Route resetting processing is processing that is executed to execute the route setting processing again on the movement task T for which the travel route has been set in the route setting processing. By executing route resetting processing, it is possible to set a more suitable travel route for a movement task T according to the transport status of the article W in the transport facility at that time, thereby improving the processing of the movement task T.

If route resetting processing is included in the target processing, the period from the execution of the previous route setting processing to the execution of the route resetting processing is set longer in the restriction mode than when the restriction mode is not enabled (in this example, when the normal mode is enabled). Note that in a situation where a large number of movement tasks T have occurred and the restriction mode has been enabled, even if route resetting processing is executed when the time elapsed from the previous route setting processing is short, there may be only a small change in the transport status of the article W in the transport facility, the travel route may remain unchanged, and the load on the control device 2 may become unnecessarily high. By restricting the execution of the route resetting processing in the restriction mode as described above, it is possible to reduce the frequency of the execution of the route resetting processing in the restriction mode and reduce the load on the control device 2.

Normal Expulsion Processing

Normal expulsion processing is processing that is executed in at least one of: the case where the transport destination specified in the first task is present on the travel route set for another transport vehicle 1; or the case where the transport destination specified in the first task is a location where transport vehicles 1 are prohibited from waiting, to evacuate (expel) the transport vehicle 1 that has completed the first task from the destination, and to move the transport vehicle 1 to a location that is off the travel route set for another transport vehicle 1 and where transport vehicles 1 are not prohibited from waiting. For example, a location where transport vehicles 1 are prohibited from waiting is a station 4 where the article W is frequently transferred, and a location where transport vehicles 1 are not prohibited from waiting is other stations 4.

If normal expulsion processing is included in the target processing, the control device 2 is prohibited from executing the normal expulsion processing in the restriction mode. In the restriction mode, the control device 2 executes simple expulsion processing instead of normal expulsion processing. Simple expulsion processing is processing that is executed unconditionally or when the destination specified in the first task is a location where transport vehicles 1 are prohibited from waiting, to evacuate the transport vehicle 1 that has completed the first task from the destination and to move the transport vehicle 1 to a location where transport vehicles 1 are not prohibited from waiting. In simple expulsion processing, unlike in normal expulsion processing, it is not determined whether or not the transport destination specified in the first task or the destination of the evacuation is on the travel route set for another transport vehicle 1. Therefore, in the restriction mode, it is possible to reduce the load associated with expel processing and reduce the load on the control device 2 by executing simple expulsion processing instead of normal expulsion processing.

Assignment Limiting Processing

Assignment limiting processing is processing that is executed to assign the first task whose transport source and transport destination are located within a specific area (hereinafter referred to as a "target area") only to local transport vehicles that are one or more transport vehicles of the transport vehicles 1, or preferentially to local transport vehicles in assignment processing. The target area may be, for example, an area that includes only a specific annular path 60, or may be an area that is the same as any of the divisional areas A described above. If assignment limiting processing is included in the target processing, the control device 2 is prohibited from executing the assignment limiting processing in the restriction mode. Assignment limiting processing and evacuation destination limiting processing described below are additional processing, and therefore, by prohibiting the execution of these types of processing in the restriction mode, it is possible to reduce the number of instances of processing executed by the control device 2 in the restriction mode, and to reduce the load on the control device 2.

Evacuation Destination Limiting Processing

Evacuation destination limiting processing is processing that is executed to limit the destination of the evacuation to a location within the target area (in this embodiment, a station 4) when the transport vehicle 1 that makes evacuation travel in the normal expulsion processing or simple expulsion processing described above is a local transport vehicle 1. If evacuation destination limiting processing is included in the target processing, the control device 2 is prohibited from executing the evacuation destination limiting processing in the restriction mode.

The embodiment disclosed in this specification is merely illustrative in all respects, and various modifications can be made as appropriate without departing from the spirit of the present disclosure.

Overview of Above-Described Embodiment

An overview of the above-described control system will be described below.

A control system for controlling a plurality of transport vehicles configured to transport an article, the control system comprising: a control device configured to execute a plurality of types of processing including assignment processing of assigning one or more movement tasks for transporting the article, to one of the plurality of transport vehicles, wherein in response to a processing load on the control device exceeding a predetermined reference load, the control system reduces the processing load on the control device by enabling a restriction mode in which the control device is restricted from executing target processing including one or more of the types of processing executed by the control device other than the assignment processing.

With this configuration, when the processing load on the control device exceeds the reference load and the restriction mode is enabled, the control device is restricted from executing the target processing so that the load on the control device can be reduced. Meanwhile, assignment processing is not included in the target processing, and therefore, the article can be transported continuously even in the restriction mode. The control device, whose processing load is reduced by being restricted from executing the target processing, can instruct the transport vehicles to transport the article. Therefore, even if the processing load on the control device becomes high enough to exceed the reference load, it is possible to avoid a situation in which the instructions to transport the article from the control device to the transport vehicles are delayed persists for a long time, and to make it less likely that a long delay will occur in the transport of the article in the system as a whole.

It is preferable that the one or more movement tasks include at least a first task out of first and second tasks, the first task being a task of transporting the article from a transport source to a transport destination, and the second task being a task of causing a transport vehicle not performing article transport among the plurality of transport vehicles to move to a location planned or predicted to be the transport source of the article, and the control device derives the processing load based on a value obtained by dividing a total number of unfinished movement tasks among the one or more movement tasks held by the control device by a total number of the plurality of transport vehicles controlled by the control device.

With this configuration, the processing load on the control device can be quantified relatively easily, and therefore it is easier to determine whether or not the processing load on the control device exceeds the reference load.

It is preferable that the plurality of types of processing executed by the control device include at least either abnormality addressing processing of addressing an abnormality occurring in a transport vehicle among the plurality of transport vehicles or entry restriction processing of restricting a transport vehicle among the plurality of transport vehicles from entering a specific area, and the abnormality addressing processing and the entry restriction processing are not included in the target processing.

If an abnormality occurs in a transport vehicle and no action is taken to address the abnormality, it may be necessary to set a transport path for the article that avoids the transport vehicle, for example, and this may cause delays in the transport of the article. In addition, if there is an area where transport vehicles should be restricted from entering and a transport vehicle enters that area, it may become difficult for the transport vehicle to travel smoothly in that area, for example, and this may cause delays in the transport of the article. In this regard, with this configuration, the target processing does not include the abnormality addressing processing and the entry restriction processing, and therefore the abnormality addressing processing and the entry restriction processing can be executed as necessary even in the restricted mode, which makes it possible to prevent delays in the transport of the article.

It is preferable that the target processing includes reconsideration processing in which a movement task assigned to a first transport vehicle among the plurality of transport vehicles in the assignment processing is reassigned to a second transport vehicle among the plurality of transport vehicles different from the first transport vehicle, and in the restriction mode, the reconsideration processing is prohibited from being executed.

By executing the reconsideration processing described above, it is possible to reassign a movement task to which a transport vehicle has already been assigned to a more suitable transport vehicle, thereby improving the processing efficiency of the movement task. However, reconsideration processing is not essential processing for transporting the article. In this regard, with this configuration, the reconsideration processing is restricted from being executed in the restriction mode. Therefore, it is possible to reduce the number of instances of processing executed by the control device in the restriction mode so that the load on the control device can be reduced.

It is preferable that the target processing includes search processing of searching for a transport vehicle among the plurality of transport vehicles to which a movement task among the one or more movement tasks is to be assigned in the assignment processing, and in the restriction mode, a range in which the transport vehicle is searched for in the search processing is set narrower than in a case where the restriction mode is not enabled.

For example, it is possible to employ a configuration with which, in a single instance of the search processing, the search range for transport vehicles is expanded until a transport vehicle to which a movement task can be assigned (hereinafter referred to as a "target transport vehicle") is found, and if the target transport vehicle is not found even when the search range reaches the set upper limit, the search processing is terminated. In this case, the processing load of a single instance of search processing tends to increase as the range set as the upper limit of the search range becomes wider. In particular, in situations where a large number of movement tasks have occurred, the number of transport vehicles to which a movement task has not been assigned may be small and there may be no transport vehicles to which a movement task has not been assigned within the range set as the upper limit of the search range, so the load associated with a single instance of search processing is likely to increase as the range set as the upper limit of the search range becomes wider. In this regard, with this configuration, the search range for transport vehicles is set narrow in the restriction mode, so the load associated with a single instance of search processing can be reduced, and the load on the control device can be reduced.

It is preferable that the target processing includes sequential assignment processing that is executed repeatedly, the sequential assignment processing is processing in which the assignment processing is sequentially executed for at least one movement task not assigned to any of the transport vehicles, until a termination condition is satisfied, an in the restriction mode, the termination condition for the sequential assignment processing is set in such a manner that the assignment processing is allowed to be executed fewer times than in a case where the restriction mode is not enabled.

The load associated with a single instance of sequential assignment processing increases as the number of movement tasks to which no transport vehicle is assigned at that time (hereinafter referred to as "unassigned tasks") increases, up to the maximum number of times that the assignment processing can be executed. In particular, in situations where a large number of movement tasks have occurred, the number of unassigned tasks at that point is large, and there is a small number of vehicles to which no movement task is assigned, and therefore, there is a possibility that a transport vehicle cannot be assigned to all of the unassigned tasks. In this regard, with this configuration, the termination condition for the sequential assignment processing is set so that the number of times the sequential assignment processing can be executed is reduced in the restriction mode, thereby reducing the load associated with a single instance of sequential assignment processing and reducing the load on the control device.

It is preferable that the target processing includes repetition processing in which sequential assignment processing is executed repeatedly, the sequential assignment processing is processing in which the assignment processing is sequentially executed for at least one movement task not assigned to any of the transport vehicles, and in the restriction mode, a period from an end of the sequential assignment processing to a start of next sequential assignment processing in the repetition processing is set longer than in a case where the restriction mode is not enabled.

When the control device repeatedly executes the sequential assignment processing, processing other than the assignment processing (for example, processing executed to receive a movement task from a host control device, processing executed to provide an instruction to a transport vehicle to which a movement task is assigned, and the above-described abnormality addressing processing, entry restriction processing, and so on) are executed during the interval period from the end of the sequential assignment processing to the start of the next sequential assignment processing. If the interval period is short compared to the number of instances of processing other than the assignment processing, there is a possibility that incomplete processing will accumulate and the load on the control device will increase. In this regard, with this configuration, this interval period can be set longer in the restriction mode. Therefore, it is possible to avoid accumulation of incomplete processing and to reduce the load on the control device.

It is preferable that the target processing includes reassignment processing in which the assignment processing is executed again for a movement task not successfully assigned to any of the transport vehicles in the assignment processing, and in the restriction mode, a period from execution of previous assignment processing to execution of the reassignment processing is set longer than in a case where the restriction mode is not enabled.

A situation where a transport vehicle cannot be assigned to a movement task in assignment processing may occur, for example, when there are only a small number of transport vehicles to which movement tasks are not assigned because many movement tasks for transporting the article has occurred. In such a case, even if reassignment processing is executed when the elapsed time since the execution of the assignment processing is short, there is a possibility that transport vehicles to which a movement task can be assigned cannot be found again, and the load on the control device becomes unnecessarily high. In this regard, with this configuration, the period from the execution of the previous assignment processing to the execution of the reassignment processing can be set longer in the restriction mode, and therefore, the frequency of execution of the reassignment processing is reduced in the restriction mode, and the load on the control device can be reduced.

It is preferable that the control device divides an area in which the plurality of transport vehicles travel into a plurality of divisional areas and manages the divisional areas, the target processing includes empty transport vehicle moving processing of moving one or more empty transport vehicles to which no movement task is assigned among the plurality of transport vehicles, in such a manner that, for each of the plurality of divisional areas, a total number of empty transport vehicles in the divisional area approaches a target value set for the divisional area, and in the restriction mode, the empty transport vehicle moving processing is prohibited, or a maximum allowed travel distance of the empty transport vehicles in the empty transport vehicle moving processing is set shorter than in a case where the restriction mode is not enabled.

By executing the empty transport vehicle moving processing described above, empty transport vehicles can be distributed and arranged in a plurality of divisional areas. Therefore, no matter which division area the transport source of the article specified in a newly generated movement task exists, an empty transport vehicle that is relatively close to the transport source can be assigned to a movement task. However, empty transport vehicle moving processing is not essential processing for transporting the article. In addition, as the distance by which an empty transport vehicle is moved in the empty transport vehicle moving processing increases, the load associated with the processing performed to find a route for the empty transport vehicle to travel increases. In this regard, with this configuration, the empty transport vehicle moving processing is prohibited or the maximum allowed travel distance of the empty transport vehicles in the empty transport vehicle moving processing is set shorter in the restriction mode. Therefore, the load on the control device can be reduced by reducing the number of instances of processing executed by the control device or by reducing the load associated with the empty transport vehicle moving control.

The control system according to the present disclosure need only be able to achieve at least one of the above-described effects.

What is claimed is:

1. A control system for controlling a plurality of transport vehicles configured to transport an article, the control system comprising:
   a control device configured to execute a plurality of types of processing comprising assignment processing of assigning one or more movement tasks for transporting the article, to one of the plurality of transport vehicles,
   wherein in response to a processing load on the control device exceeding a predetermined reference load, the control system reduces the processing load on the control device by enabling a restriction mode in which the control device is restricted from executing target processing comprising one or more of the types of processing executed by the control device other than the assignment processing, and in response to the processing load becoming equal to or less than a second reference load that is set equal to or less than the first references load, the control system cancels the restriction mode.

2. The control system according to claim 1,
   wherein the plurality of types of processing executed by the control device comprise at least either abnormality addressing processing of addressing an abnormality occurring in a transport vehicle among the plurality of transport vehicles or entry restriction processing of restricting a transport vehicle among the plurality of transport vehicles from entering a specific area, and
   wherein the abnormality addressing processing and the entry restriction processing are not included in the target processing.

3. A control system for controlling a plurality of transport vehicles configured to transport an article, the control system comprising:
   a control device configured to execute a plurality of types of processing comprising assignment processing of assigning one or more movement tasks for transporting the article, to one of the plurality of transport vehicles,
   wherein in response to a processing load on the control device exceeding a predetermined reference load, the control system reduces the processing load on the control device by enabling a restriction mode in which the control device is restricted from executing target processing comprising one or more of the types of processing executed by the control device other than the assignment processing,
   wherein the one or more movement tasks comprise at least a first task out of first and second tasks, the first task being a task of transporting the article from a transport source to a transport destination, and the second task being a task of causing a transport vehicle not performing article transport among the plurality of transport vehicles to move to a location planned or predicted to be the transport source of the article, and
   wherein the control device derives the processing load based on a value obtained by dividing a total number of unfinished movement tasks among the one or more movement tasks held by the control device by a total number of the plurality of transport vehicles controlled by the control device.

4. A control system for controlling a plurality of transport vehicles configured to transport an article, the control system comprising:

a control device configured to execute a plurality of types of processing comprising assignment processing of assigning one or more movement tasks for transporting the article, to one of the plurality of transport vehicles, wherein in response to a processing load on the control device exceeding a predetermined reference load, the control system reduces the processing load on the control device by enabling a restriction mode in which the control device is restricted from executing target processing comprising one or more of the types of processing executed by the control device other than the assignment processing, wherein the target processing comprises reconsideration processing in which a movement task assigned to a first transport vehicle among the plurality of transport vehicles in the assignment processing is reassigned to a second transport vehicle among the plurality of transport vehicles different from the first transport vehicle, and wherein in the restriction mode, the reconsideration processing is prohibited from being executed.

5. A control system for controlling a plurality of transport vehicles configured to transport an article, the control system comprising:

a control device configured to execute a plurality of types of processing comprising assignment processing of assigning one or more movement tasks for transporting the article, to one of the plurality of transport vehicles, wherein in response to a processing load on the control device exceeding a predetermined reference load, the control system reduces the processing load on the control device by enabling a restriction mode in which the control device is restricted from executing target processing comprising one or more of the types of processing executed by the control device other than the assignment processing, wherein the target processing comprises search processing of searching for a transport vehicle among the plurality of transport vehicles to which a movement task among the one or more movement tasks is to be assigned in the assignment processing, and wherein in the restriction mode, a range in which the transport vehicle is searched for in the search processing is set narrower than in a case where the restriction mode is not enabled.

6. A control system for controlling a plurality of transport vehicles configured to transport an article, the control system comprising:

a control device configured to execute a plurality of types of processing comprising assignment processing of assigning one or more movement tasks for transporting the article, to one of the plurality of transport vehicles, wherein in response to a processing load on the control device exceeding a predetermined reference load, the control system reduces the processing load on the control device by enabling a restriction mode in which the control device is restricted from executing target processing comprising one or more of the types of processing executed by the control device other than the assignment processing, the target processing comprises sequential assignment processing that is executed repeatedly, the sequential assignment processing is processing in which the assignment processing is sequentially executed for at least one movement task not assigned to any of the transport vehicles, until a termination condition is satisfied, and in the restriction mode, the termination condition for the sequential assignment processing is set in such a manner that the assignment processing is allowed to be executed fewer times than in a case where the restriction mode is not enabled.

7. A control system for controlling a plurality of transport vehicles configured to transport an article, the control system comprising:

a control device configured to execute a plurality of types of processing comprising assignment processing of assigning one or more movement tasks for transporting the article, to one of the plurality of transport vehicles, wherein in response to a processing load on the control device exceeding a predetermined reference load, the control system reduces the processing load on the control device by enabling a restriction mode in which the control device is restricted from executing target processing comprising one or more of the types of processing executed by the control device other than the assignment processing, wherein the target processing comprises repetition processing in which sequential assignment processing is executed repeatedly, wherein the sequential assignment processing is processing in which the assignment processing is sequentially executed for at least one movement task not assigned to any of the transport vehicles, and wherein in the restriction mode, a period from an end of the sequential assignment processing to a start of next sequential assignment processing in the repetition processing is set longer than in a case where the restriction mode is not enabled.

8. A control system for controlling a plurality of transport vehicles configured to transport an article, the control system comprising:

a control device configured to execute a plurality of types of processing comprising assignment processing of assigning one or more movement tasks for transporting the article, to one of the plurality of transport vehicles, wherein in response to a processing load on the control device exceeding a predetermined reference load, the control system reduces the processing load on the control device by enabling a restriction mode in which the control device is restricted from executing target processing comprising one or more of the types of processing executed by the control device other than the assignment processing, wherein the target processing comprises reassignment processing in which the assignment processing is executed again for a movement task not successfully assigned to any of the transport vehicles in the assignment processing, and wherein in the restriction mode, a period from execution of previous assignment processing to execution of the reassignment processing is set longer than in a case where the restriction mode is not enabled.

9. A control system for controlling a plurality of transport vehicles configured to transport an article, the control system comprising:

a control device configured to execute a plurality of types of processing comprising assignment processing of assigning one or more movement tasks for transporting the article, to one of the plurality of transport vehicles, wherein in response to a processing load on the control device exceeding a predetermined reference load, the control system reduces the processing load on the control device by enabling a restriction mode in which the control device is restricted from executing target processing comprising one or more of the types of processing executed by the control device other than the assignment processing, wherein the control device divides an area in which the plurality of transport vehicles travel into a plurality of divisional areas and manages the divisional areas, wherein the target processing comprises empty transport vehicle moving processing of moving one or more empty transport vehicles to which no movement task is assigned among the plurality of transport vehicles, in such a manner that, for each of the plurality of divisional areas, a total number of empty transport vehicles in the divisional area approaches a target value set for the divisional area, and wherein, in the restriction mode, the empty transport vehicle moving processing is prohibited, or a maximum allowed travel distance of the empty transport vehicles in the empty transport vehicle moving processing is set shorter than in a case where the restriction mode is not enabled.

* * * * *